United States Patent
Wilson et al.

(10) Patent No.: US 11,155,680 B2
(45) Date of Patent: *Oct. 26, 2021

(54) POLYMERIC MATERIALS

(71) Applicant: Victrex Manufacturing Limited, Lancashire (GB)

(72) Inventors: Brian Wilson, Lancashire (GB); Adam Chaplin, Lancashire (GB); Alice Victoria Mary Matthews, Lancashire (GB); Carlie Ann Beardsall, Lancashire (GB); Richard Luke Ainsworth, Lancashire (GB); Carlo Capra, Griesheim (DE)

(73) Assignee: VICTREX MANUFACTURING LIMITED, Lancashire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,174

(22) Filed: Sep. 30, 2019

(65) Prior Publication Data

US 2020/0024392 A1    Jan. 23, 2020

Related U.S. Application Data

(63) Continuation of application No. 14/901,150, filed as application No. PCT/GB2014/051936 on Jun. 25, 2014, now Pat. No. 10,428,179.

(30) Foreign Application Priority Data

Jun. 26, 2013   (GB) .................................. 1311376

(51) Int. Cl.
| | | |
|---|---|---|
| *C08G 65/40* | (2006.01) | |
| *C08L 71/12* | (2006.01) | |
| *C08K 3/26* | (2006.01) | |
| *C08K 3/04* | (2006.01) | |
| *C08K 7/06* | (2006.01) | |
| *C08K 7/14* | (2006.01) | |
| *C08L 101/04* | (2006.01) | |

(52) U.S. Cl.
CPC ......... *C08G 65/4012* (2013.01); *C08G 65/40* (2013.01); *C08G 65/4093* (2013.01); *C08K 3/04* (2013.01); *C08K 3/26* (2013.01); *C08K 7/06* (2013.01); *C08K 7/14* (2013.01); *C08L 71/12* (2013.01); *C08L 101/04* (2013.01); *C08G 2650/40* (2013.01)

(58) Field of Classification Search
CPC ............................ C08G 65/4012; C08L 71/12
See application file for complete search history.

(56) References Cited

U.S. PATENT DOCUMENTS

| | | | |
|---|---|---|---|
| 4,717,761 A | 1/1988 | Staniland | |
| 4,766,197 A | 8/1988 | Clendinning et al. | |
| 4,837,296 A | 6/1989 | Heinz | |
| 10,428,179 B2 * | 10/2019 | Wilson | ..................... C08K 3/26 |
| 2011/0213095 A1 | 9/2011 | Louis | |

FOREIGN PATENT DOCUMENTS

| | | |
|---|---|---|
| CN | 1162602 A | 10/1997 |
| EP | 0184458 | 6/1986 |
| EP | 0225750 | 6/1987 |
| EP | 0266132 | 5/1988 |
| GB | 2495624 | 4/2013 |
| WO | WO 2006/106352 A1 | 10/2006 |
| WO | WO 2007/144610 A1 | 12/2007 |
| WO | 2010/046484 | 4/2010 |
| WO | WO 2013/054114 A1 | 4/2013 |

OTHER PUBLICATIONS

Wang et al., "Synthesis and Thermal Properties of PEEK PEDEK Block Copolymers." Chemical Journal of Chinese Universities, 2004, 25(6): 1156-1159.
International Search Report for Application No. PCT/GB2014/051936 dated Nov. 4, 2014 (3 pages).
United Kingdom Search Report for Application No. 1411290.8 dated Dec. 18, 2014 (1 page).

* cited by examiner

Primary Examiner — Vickey Nerangis
(74) Attorney, Agent, or Firm — Casimir Jones, S.C.

(57) ABSTRACT

A polymeric material has a repeat unit of formula —O-Ph-O-Ph-CO-Ph- I and a repeat unit of formula —O-Ph-Ph-O-Ph-CO-Ph- II wherein Ph represents a phenylene moiety; wherein the repeat units I and II are in the relative molar properties I:II of from 65:35 to 95:5; wherein $\log_{10}$ (X %)>1.50-0.26 MV; wherein X % refers to the % crystallinity measured as described in Example 31 and MV refers to the melt viscosity measured as described in Example 30. A process for making the polymeric material comprises polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate wherein: (i) the mole % of said potassium carbonate is at least 2.5 and/or (ii) the following relationship applies $$\frac{\text{the } D_{50} \text{ of said sodium carbonate in } \mu m}{\text{mole \% of potassium carbonate}} = <46.$$

22 Claims, 2 Drawing Sheets

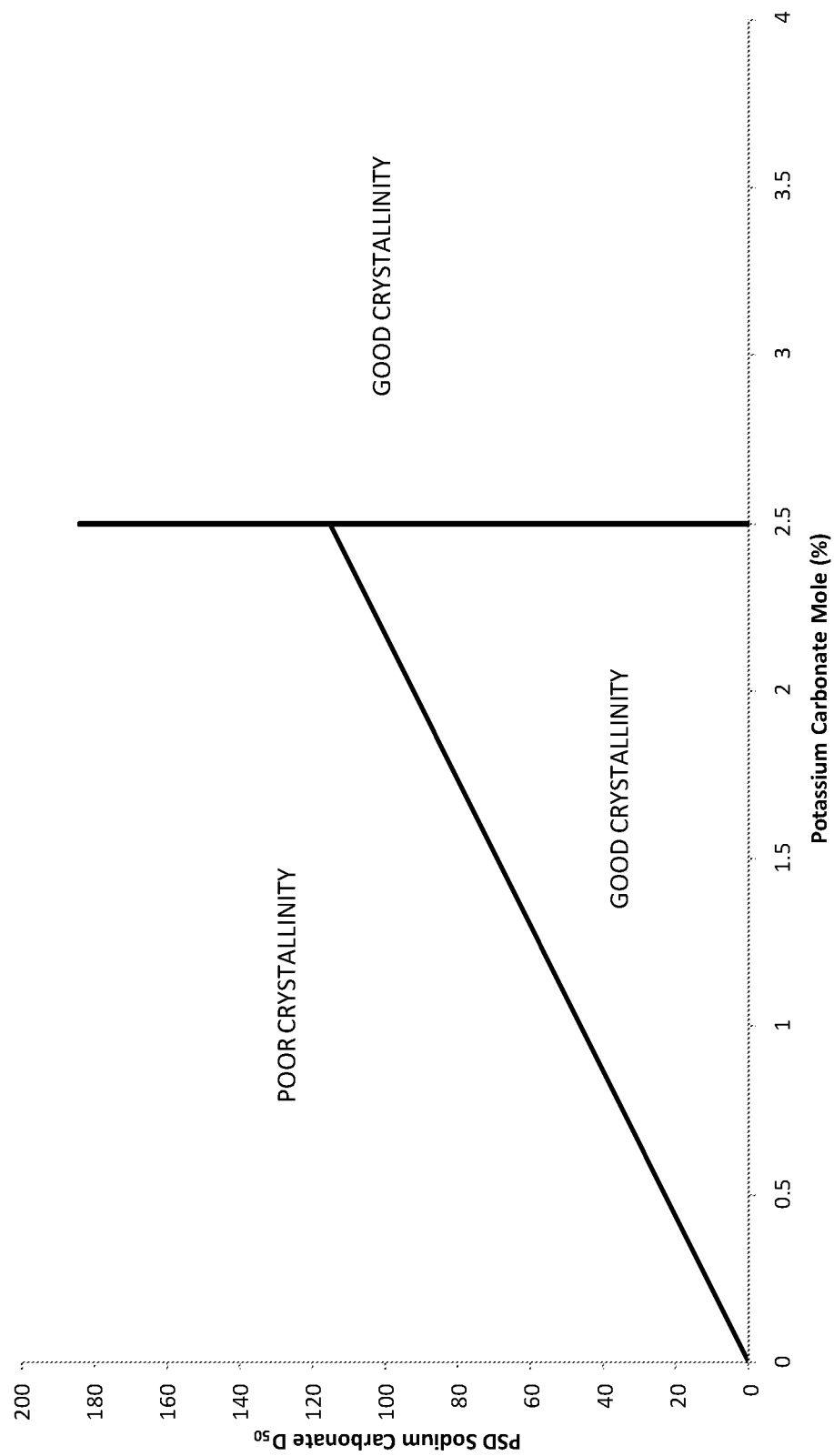

POLYMERIC MATERIALS

BACKGROUND OF THE INVENTION

This invention relates to polymeric materials. Preferred embodiments relate to thermoplastic composites comprising polymeric materials for use, for example, in the composites industry.

There is a wide range of thermoplastic polymeric material available for use in industry, either alone or as part of composite materials. However, industry is constantly demanding materials with properties which are improved in at least some respect over existing materials.

Polyphenylene sulphide (PPS) is a known polymeric material with a relatively low melting temperature (Tm) of 290° C.; however its glass transition temperature (Tg) is 85° C. to 100° C. which is too low for some applications. On the other hand, polyetheretherketone (PEEK) has a suitable Tg of 143° C. but its Tm of 343° C. is much higher than desirable. Nonetheless, PEEK is the material of choice for many commercial applications because it is highly crystalline and has outstanding chemical resistance properties.

U.S. Pat. No. 4,717,761 (ICI) describes a polymer containing -ether-phenyl-ether-phenyl-carbonyl-phenyl- (i.e. PEEK) and -ether-phenyl-phenyl-ether-phenyl-carbonyl-phenyl- (i.e. PEDEK) repeat units. The copolymer is said to have a low Tm. However, there is no disclosure in the cited reference relating to the level of crystallinity of the copolymer and/or how chemically (e.g. solvent) resistant it may be in use.

It is an object of the present invention to provide a polymeric material per se and a method of making such a polymeric material having a relatively low Tm, a relatively high Tg and a relatively high crystallinity.

SUMMARY OF THE INVENTION

This invention is based on the discovery of a method for making copolymers of PEEK and PEDEK of increased crystallinity compared to materials described in U.S. Pat. No. 4,717,761 and novel PEEK/PEDEK copolymers per se.

According to a first aspect of the invention, there is provided a polymeric material having a repeat unit of formula

  I and a repeat unit of formula

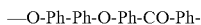  II wherein Ph represents a phenylene moiety
wherein the repeat units I and II are in the relative molar proportions I:II of from 65:35 to 95:5; and
wherein $\log_{10}$ (X %)>1.50-0.26 MV;
wherein X % refers to the % crystallinity measured as described in Example 31 and MV refers to the melt viscosity measured as described in Example 30.

BRIEF DESCRIPTION OF THE DRAWINGS

FIG. 2 is a schematic describing the relationship between D50 of sodium carbonate and mole % excess of potassium carbonate

DETAILED DESCRIPTION OF THE INVENTION

Figure 1:
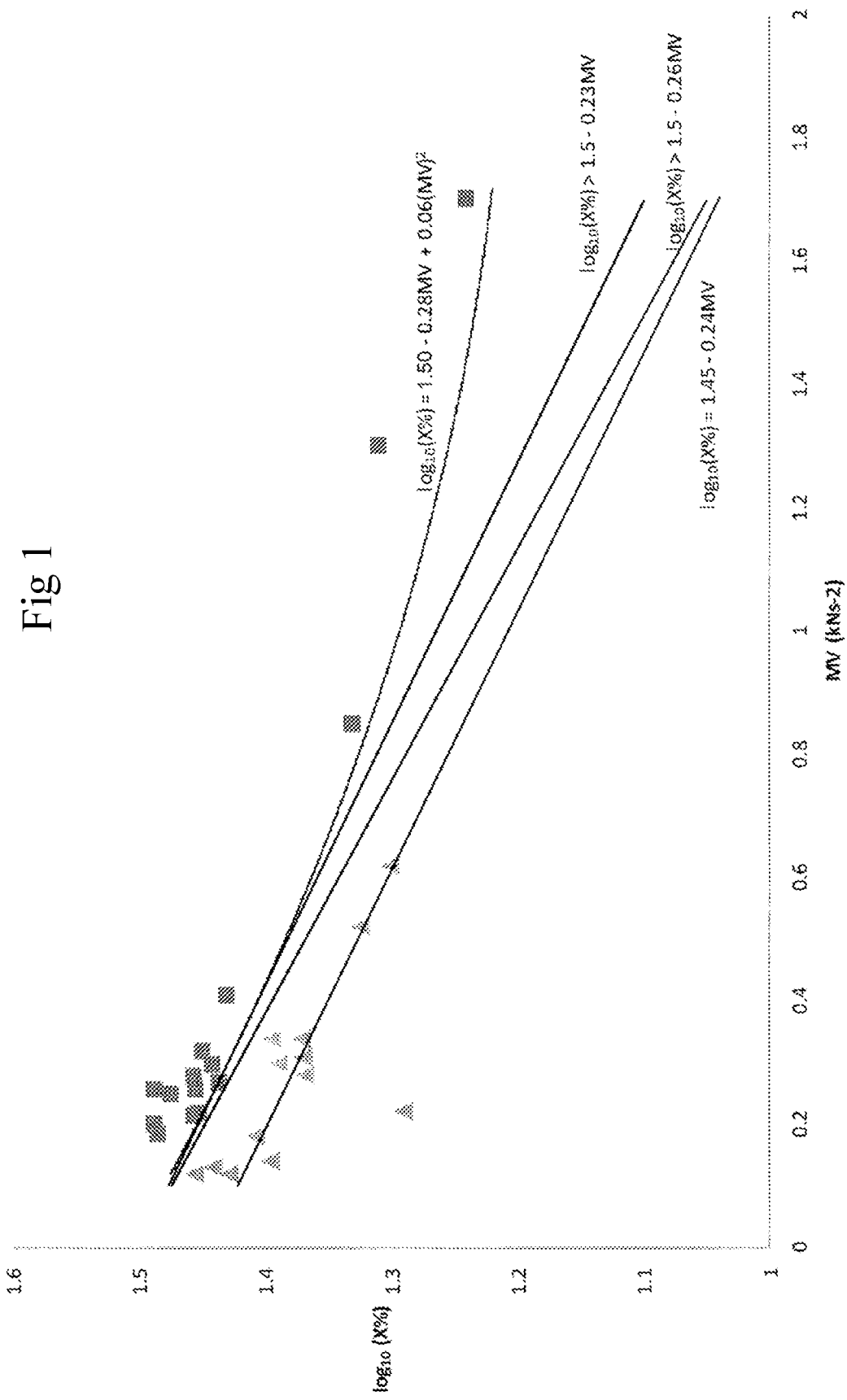
FIG. 1 is a graph of $\log_{10}$ (X %), wherein X refers to the crystallinity v. melt viscosity (MV) for various PEEK:PEDEK polymeric materials made using various processes.

The phenylene moieties (Ph) in each repeat unit may independently have 1,4-para linkages to atoms to which they are bonded or 1,3-meta linkages. Where a phenylene moiety includes 1,3-linkages, the moiety will be in the amorphous phase of the polymer. Crystalline phases will include phenylene moieties with 1,4-linkages. In many applications it is preferred for the polymeric material to be highly crystalline and, accordingly, the polymeric material preferably includes high levels of phenylene moieties with 1,4-linkages.

In a preferred embodiment, at least 95%, preferably at least 99%, of the number of phenylene moieties (Ph) in the repeat unit of formula I have 1,4-linkages to moieties to which they are bonded. It is especially preferred that each phenylene moiety in the repeat unit of formula I has 1,4-linkages to moieties to which it is bonded.

In a preferred embodiment, at least 95%, preferably at least 99%, of the number of phenylene moieties (Ph) in the repeat unit of formula II have 1,4-linkages to moieties to which they are bonded. It is especially preferred that each phenylene moiety in the repeat unit of formula II has 1,4-linkages to moieties to which it is bonded.

Preferably, the phenylene moieties in repeat unit of formula I are unsubstituted. Preferably, the phenylene moieties in repeat unit of formula II are unsubstituted.

Said repeat unit of formula I suitably has the structure

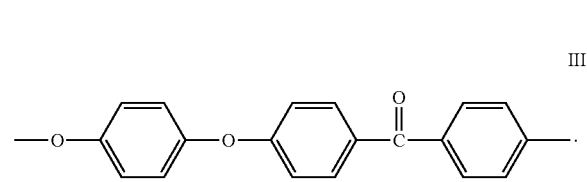  III

Said repeat unit of formula II suitably has the structure

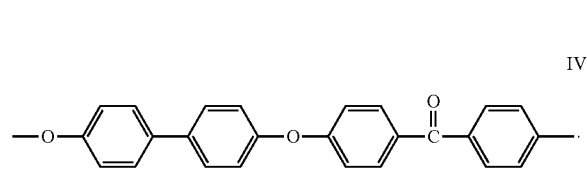  IV

Preferred polymeric materials in accordance with the invention have a crystallinity which is greater than expected from the prior art. Preferably, $\log_{10}$ (X %)>1.50-0.23 MV. More preferably $\log_{10}$ (X %)>1.50-0.28 MV+0.06 MV². The derivation of the aforementioned relationships is discussed hereinafter with reference to FIG. 1.

Said polymeric material may include at least 68 mol %, preferably at least 71 mol % of repeat units of formula I. Particular advantageous polymeric materials may include at least 72 mol %, or, especially, at least 74 mol % of repeat units of formula I. Said polymeric material may include less than 90 mol %, suitably 82 mol % or less of repeat units of formula I. Said polymeric material may include 68 to 82 mol %, preferably 70 to 80 mol %, more preferably 72 to 77 mol % of units of formula I.

Said polymeric material may include at least 10 mol %, preferably at least 18 mol %, of repeat units of formula II. Said polymeric material may include less than 32 mol %, preferably less than 29 mol % of repeat units of formula II. Particularly advantageous polymeric materials may include 28 mol % or less; or 26 mol % or less of repeat units of formula II. Said polymeric material may include 18 to 32 mol %, preferably 20 to 30 mol %, more preferably 23 to 28 mol % of units of formula II.

The sum of the mol % of units of formula I and II in said polymeric material is suitably at least 95 mol %, is preferably at least 98 mol %, is more preferably at least 99 mol % and, especially, is about 100 mol %.

The ratio defined as the mol % of units of formula I divided by the mol % of units of formula II may be in the range 1.8 to 5.6, is suitably in the range 2.3 to 4 and is preferably in the range 2.6 to 3.3.

The Tm of said polymeric material (suitably measured as described herein) may be less than 330° C., is suitably less than 320° C., is preferably less than 310° C. In some embodiments, the Tm may be less than 306° C. The Tm may be greater than 280° C., or greater than 290° C., 295° C. or 300° C. The Tm is preferably in the range 300° C. to 310° C.

The Tg of said polymeric material (suitably measured as described herein) may be greater than 130° C., preferably greater than 135° C., more preferably 140° C. or greater. The Tg may be less than 175° C., less than 165° C., less than 160° C. or less than 155° C. The Tg is preferably in the range 145° C. to 155° C.

The difference (Tm−Tg) between the Tm and Tg may be at least 130° C., preferably at least 140° C., more preferably at least 150° C. The difference may be less than 170° C. or less than 165° C. In a preferred embodiment, the difference is in the range 145-165° C.

In a preferred embodiment, said polymeric material has a Tg in the range 145° C.-155° C., a Tm in the range 300° C. to 310° C. and the difference between the Tm and Tg is in the range 145° C. to 165° C.

Said polymeric material may have a crystallinity measured as described in Example 31 of at least 25%.

Said polymeric material suitably has a melt viscosity (MV) of at least 0.10 kNsm$^{-2}$, preferably has a MV of at least 0.15 kNsm$^{-2}$, more preferably at least 0.20 kNsm$^{-2}$, especially at least 0.25 kNsm$^{-2}$. MV is suitably measured using capillary rheometry operating at 340° C. at a shear rate of 1000 s$^{-1}$ using a tungsten carbide die, 0.5 mm×3.175 mm. Said polymeric material may have a MV of less than 1.8 kNsm$^{-2}$, suitably less than 1.2 kNsm$^{-2}$.

Said polymeric material may have a tensile strength, measured in accordance with ISO527 of at least 40 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ISO178 of at least 130 MPa. The flexural strength is preferably in the range 135-180 MPa, more preferably in the range 140-150 MPa.

Said polymeric material may have a flexural modulus, measured in accordance with ISO178 of at least 2 GPa, preferably at least 3 GPa. The flexural modulus is preferably in the range 3.0-4.5 GPa, more preferably in the range 3.0-4.0 GPa.

Said polymeric material may be in the form of pellets or granules, wherein the pellets or granules include at least 95 wt %, preferably at least 99 wt %, especially about 100 wt % of said polymeric material. Pellets or granules may have a maximum dimension of less than 10 mm, preferably less than 7.5 mm, more preferably less than 5.0 mm.

Said polymeric material may be part of a composition which may include said polymeric material and a filler means. Said filler means may include a fibrous filler or a non-fibrous filler. Said filler means may include both a fibrous filler and a non-fibrous filler. A said fibrous filler may be continuous or discontinuous.

A said fibrous filler may be selected from inorganic fibrous materials, non-melting and high-melting organic fibrous materials, such as aramid fibres, and carbon fibre.

A said fibrous filler may be selected from glass fibre, carbon fibre, asbestos fibre, silica fibre, alumina fibre, zirconia fibre, boron nitride fibre, silicon nitride fibre, boron fibre, fluorocarbon resin fibre and potassium titanate fibre. Preferred fibrous fillers are glass fibre and carbon fibre.

A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, carbon powder, nanotubes and barium sulfate. The non-fibrous fillers may be introduced in the form of powder or flaky particles.

Said composition may define a composite material which could be prepared as described in Impregnation Techniques for Thermoplastic Matrix Composites. A Miller and A G Gibson, Polymer & Polymer Composites 4(7), 459-481 (1996), EP102158 and EP102159, the contents of which are incorporated herein by reference. Preferably, in the method, said polymeric material and said filler means are mixed at an elevated temperature, suitably at a temperature at or above the melting temperature of said polymeric material. Thus, suitably, said polymeric material and filler means are mixed whilst the polymeric material is molten. Said elevated temperature is suitably below the decomposition temperature of the polymeric material. Said elevated temperature is preferably at or above the main peak of the melting endotherm (Tm) for said polymeric material. Said elevated temperature is preferably at least 300° C. Advantageously, the molten polymeric material can readily wet the filler and/or penetrate consolidated fillers, such as fibrous mats or woven fabrics, so the composite material prepared comprises the polymeric material and filler means which is substantially uniformly dispersed throughout the polymeric material.

The composite material may be prepared in a substantially continuous process. In this case polymeric material and filler means may be constantly fed to a location wherein they are mixed and heated. An example of such a continuous process is extrusion. Another example (which may be particularly relevant wherein the filler means comprises a fibrous filler) involves causing a continuous filamentous mass to move through a melt or aqueous dispersion comprising said polymeric material. The continuous filamentous mass may comprise a continuous length of fibrous filler or, more preferably, a plurality of continuous filaments which have been consolidated at least to some extent. The continuous fibrous mass may comprise a tow, roving, braid, woven fabric or unwoven fabric. The filaments which make up the fibrous mass may be arranged substantially uniformly or randomly within the mass. A composite material could be prepared as described in PCT/GB2003/001872, U.S. Pat. No. 6,372,294 or EP1215022.

Alternatively, the composite material may be prepared in a discontinuous process. In this case, a predetermined amount of said polymeric material and a predetermined amount of said filler means may be selected and contacted and a composite material prepared by causing the polymeric material to melt and causing the polymeric material and filler means to mix to form a substantially uniform composite material.

The composite material may be formed into a particulate form for example into pellets or granules. Pellets or granules may have a maximum dimension of less than 10 mm, preferably less than 7.5 mm, more preferably less than 5.0 mm.

Preferably, said filler means comprises one or more fillers selected from glass fibre, carbon fibre, carbon black and a fluorocarbon resin. More preferably, said filler means comprises glass fibre or carbon fibre.

A composition or composite material as described may include 20 to 99.9 wt % (e.g. 20 to 70 wt %) of said polymeric material and 0.1 to 80 wt % (e.g. 30 to 80 wt %) of filler means. Preferred embodiments include greater than 10 wt %, more preferably greater than 40 wt % of filler means.

The invention extends to a composite material as described per se.

According to a second aspect of the invention, there is provided a process for the production of a polymeric material having a repeat unit of formula —O-Ph-O-Ph-CO-Ph-    I and a repeat unit of formula —O-Ph-Ph-O-Ph-CO-Ph-    II wherein Ph represents a phenylene moiety, said process comprising polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate wherein:
(i) the mole % of said potassium carbonate is at least 2.5 and/or
(ii) the following relationship (referred to as the "D50/mole % relationship") applies $$\frac{\text{the } D_{50} \text{ of said sodium carbonate in } \mu m}{\text{mole \% of potassium carbonate}} = <46$$

The D50 of the sodium carbonate may be measured as described in Example 29.

The mole % of said potassium carbonate is suitably defined as:

$$\frac{\text{the number of moles of potassium carbonate}}{\text{the total number of moles of hydroxy monomer(s) used}} \times 100\%$$

Under option (i), the mole % of said potassium carbonate may be at least 3 mole %, is preferably at least 3.5 mole %, is more preferably at least 3.9 mole %. The mole % of said potassium carbonate may be less than 10 mole %, preferably less than 8 mole %, more preferably less than 6 mole %, especially less than 5 mole %. Preferably, the mole % of said potassium carbonate is in the range 3.5 to 6 mole %, more preferably in the range 3.5 to 4.9 mole %.

The total mole % of carbonates used in the method (i.e. the total number of moles of carbonates used in method divided by the total number of moles of hydroxy monomer(s) used, expressed as a percentage) is suitably at least 100%.

The total mole % of carbonates may be greater than 100 mole %. It may be less than 105 mole %.

The mole % of sodium carbonate used in the method may be at least 90 mole %, preferably at least 92 mole %, more preferably at least 95 mole %.

The sum of the mole % (again related to the moles of hydroxy monomer(s)) of sodium carbonate and potassium carbonate used in the method is preferably at least 100 mole % and is more preferably greater than 100 mole %. It may be in the range 100-105 mole %.

The mole % of carbonates (which term is intended to encompass carbonate ($CO_3^{2-}$) and bicarbonate ($HCO_3^{-}$)) other than sodium carbonate and potassium carbonate used in the method is preferably less than 5 mole %, more preferably less than 1 mole % (again related to the moles of hydroxy monomer(s)).

Preferably, the only carbonates used in the method are sodium carbonate and potassium carbonate.

Under option (ii), the D50/mole % relationship is preferably less than 44, more preferably less than 42, especially less than 40. Said relationship may be less than 30 or 26. D50 is suitably measured as described in Example 29.

Preferably, both the relationships described in options (i) and (ii) apply.

The potassium carbonate selected for use in the method is preferably able to pass through a 500 μm mesh screen.

The D50 of said sodium carbonate is suitably less than 140 μm, preferably less than 125 μm, more preferably less than 110 μm. The D50 may be at least 50 μm.

In the second aspect, the repeat units of formulas I and II may be as described above in said first aspect. Thus, the phenylene moieties may be as described in the first aspect. Preferably, therefore, said repeat unit of formula I suitably has the structure

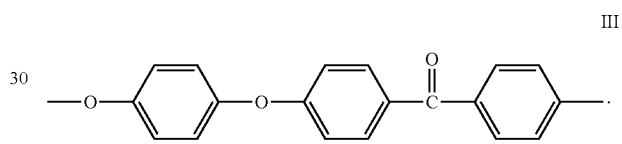

III

Said repeat unit of formula II suitably has the structure

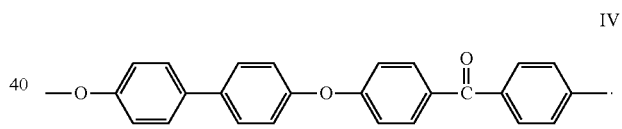

IV

The process of the second aspect may comprise selecting a dihydroxybenzene compound of formula

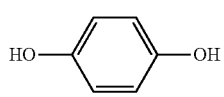

V and selecting a dihydroxybiphenyl compound of formula

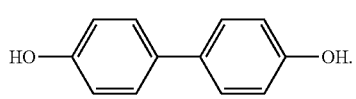

VI

The molar proportions of compounds V and VI are preferably in the range 65:35 to 95:5. The molar proportions may be in the range 68:32-90:10, preferably in the range 70:30-80:20, more preferably in the range 72:28-77.23.

The process may comprise polycondensing said compounds of formulas V and VI with a compound of formula

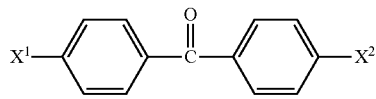

VII where $X^1$ and $X^2$ independently represent halogen atoms preferably selected from chlorine and fluorine atoms. Preferably, $X^1$ and $X^2$ represent fluorine atoms.

Preferably, the number of moles of monomers which include chlorine or fluorine atoms which are polycondensed in the process are at least equal to the number of moles of monomers which include two hydroxy groups (e.g. compounds V and VI). It is especially preferred that the number of moles of monomers which include chlorine or fluorine atoms (e.g. compound VII) is slightly greater than the number of moles of monomers which include two hydroxy groups.

Preferably, at least 95 wt %, more preferably at least 99 wt % of monomers used in the process are made up of monomers of formulae V, VI and VII. Preferably, substantially the only monomers used in the process are those of formulae V, VI and VII.

Said process of the second aspect is preferably carried out in the presence of a solvent. The solvent may be of formula

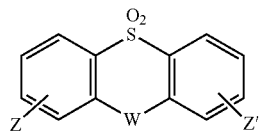

where W is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxanthin dioxide and 4-phenylsulphonyl biphenyl. Diphenylsulphone is a preferred solvent.

The process is preferably carried out under substantially anhydrous conditions. In the process, the compounds of formula V, VI and VII are suitably contacted in the presence of said solvent, especially diphenylsulphone. Polymerisation is suitably effected at a temperature within the range 150°-400° C. In the process, the reactants are suitably heated up to a maximum temperature which may be greater than 300° C., for example in the range 300° C. to 350° C. Preferably, however, prior to reaching the maximum temperature, the reagents may be held at one or more temperatures lower than the maximum temperature. For example, the process may involve holding the reagents at a temperature within the range 160-200° C. for at least 20 minutes; and/or may involve holding the reagents at a temperature within the range 200 to 240° C. for at least 20 minutes.

The process of the second aspect is preferably for making a polymeric material of the first aspect.

Any invention described herein may be combined with any feature of any other invention described herein mutatis mutandis.

Specific embodiments of the invention will now be described, by way of example, with reference to the figures wherein:

FIG. 1 is a graph of $\log_{10}$ (X %), wherein X refers to the crystallinity v. melt viscosity (MV) for various PEEK:PEDEK polymeric materials made using various processes;

FIG. 2 is a schematic describing the relationship between $D_{50}$ of sodium carbonate and mole % excess of potassium carbonate.

The following are referred to herein:

PEEK 150—refers to polyetheretherketone supplied by Victrex Manufacturing Limited which has a melt viscosity, measured using capillary rheometry operating at 400° C. and a shear rate of 1000 s$^{-1}$ using a tungsten carbide die (0.5 mm×3.175 mm), of 0.15 kNsm$^{-2}$.

Polymers were prepared as described in Example 1 to 28. Subsequent examples include details on procedures and tests undertaken.

Example 1—Preparation of 0.5 Mol
Polyetheretherketone
(PEEK)-Polyetherdiphenyletherketone (PEDEK)
Copolymer A 0.5 litre flanged flask fitted with a ground glass lid, stirrer/stirrer guide, nitrogen inlet and outlet was charged with 4,4'-diflurobenzophenone (111.29 g, 0.510 mol), 1,4-dihydroxybenzene (41.30 g, 0.375 mol), 4,4'-dihydroxydiphenyl (23.28 g, 0.125 mol) and diphenylsulphone (241.07 g) and purged with nitrogen for 1 hour. The contents were then heated under a nitrogen blanket to 160° C. to form an almost colourless solution. While maintaining a nitrogen blanket, dried sodium carbonate (53.00 g, 0.5 mol) and potassium carbonate (2.76 g, 0.02 mol), both sieved through a screen with a mesh size of 500 micrometres, were added. The temperature was raised to 185° C. at 1° C./min and held for 100 minutes. The temperature was raised to 205° C. at 1° C./min and held for 20 minutes. The temperature was raised to 315° C. at 1° C./min and held for approximately 60 minutes or until the desired MV was reached as indicated by the torque rise on the stirrer. The required torque rise was determined from a calibration graph of torque rise versus MV. The reaction mixture was then poured into a foil tray, allowed to cool, milled and washed with 2 litres of acetone and then with warm water at a temperature of 40-50° C. until the conductivity of the waste water was <2 μS. The resulting polymer powder was dried in an air oven for 12 hours at 120° C.

Examples 2 to 9—Preparation of
Polyetheretherketone
(PEEK)-Polyetherdiphenyletherketone (PEDEK)
Copolymer The procedure described in Example 1 was repeated except that the quantity of potassium carbonate and the mesh size used to sieve the sodium carbonate were varied to provide polyetheretherketone (PEEK)-polyetherdiphenyletherketone (PEDEK) copolymers of different crystallinity as shown in Table 1.

Example 10—Preparation of Polyetheretherketone
(PEEK)-Polyetherdiphenyletherketone (PEDEK)
Copolymer Based Upon Example 1 of U.S. Pat.
No. 4,717,761

A 0.5 litre flanged flask fitted with a ground glass lid, stirrer/stirrer guide, nitrogen inlet and outlet was charged with 4,4'-diflurobenzophenone (112.38 g, 0.515 mol), 1,4-dihydroxybenzene (41.30 g, 0.375 mol), 4,4'-dihydroxydiphenyl (23.28 g, 0.125 mol) and diphenylsulphone (243.10 g) and purged with nitrogen for 1 hour. The contents were then heated under a nitrogen blanket to 180° C. to form an almost colourless solution. While maintaining a nitrogen blanket, dried sodium carbonate (53.00 g, 0.5 mol) and potassium carbonate (0.35 g, 0.003 mol), both sieved through a screen with a mesh of 500 micrometres, were added. The temperature was raised to 200° C. at 1° C./min and held for 60 minutes. The temperature was raised to 250° C. at 1° C./min and held for 60 minutes. The temperature was raised to 300° C. at 1° C./min and held for 60 minutes. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Example 11—Preparation of Polyetheretherketone (PEEK)-Polyetherdiphenyletherketone (PEDEK) Copolymer The procedure of Example 10 was followed except that the reagents of Example 11 were reacted until a higher torque value was achieved compared to Example 10, so the copolymer of Example 11 has a higher MV.

Example 12—Preparation of Polyetheretherketone (PEEK)-Polyetherdiphenyletherketone (PEDEK) Copolymer Based Upon U.S. Pat. No. 4,717,761

The procedure described in Example 10 was repeated except that the particle size distribution of the sodium carbonate was increased (D50 approximately 140 µm) to establish its effect on polyetheretherketone (PEEK)-polyetherdiphenyletherketone (PEDEK) copolymer crystallinity as shown in Table 1. The larger particle size of sodium carbonate resulted in no polymerisation taking place, so a further 4 mol % of sodium carbonate and 1 mol % of hydroquinone had to be added to the reaction.

Examples 13 & 14—Preparation of Polyetheretherketone (PEEK)-Polyetherdiphenyletherketone (PEDEK) Copolymer A 0.5 litre flanged flask fitted with a ground glass lid, stirrer/stirrer guide, nitrogen inlet and outlet was charged with 4,4'-diflurobenzophenone (111.29 g, 0.515 mol), 1,4-dihydroxybenzene (41.30 g, 0.375 mole), 4,4'-dihydroxydiphenyl (23.28 g, 0.125 mol) and diphenylsulphone (24.09 g) and purged with nitrogen for 1 hour. The contents were then heated under a nitrogen blanket to 200° C. to form an almost colourless solution. While maintaining a nitrogen blanket, dried sodium carbonate (53.00 g, 0.5 mol) and potassium carbonate (3.46 g, 0.025 mol), both sieved through a screen with a mesh of 500 micrometres, were added. The temperature was raised to 250° C. at 1° C./min and held for 15 minutes. The temperature was raised to 320° C. at 1° C./min and held for 60 minutes. The reaction mixture was allowed to cool and stand overnight under a nitrogen blanket. The following day the temperature of the mixture was raised to 320° C. and held for 150 minutes. The vessel was then charged with 5 g of 4,4'-dichlorodiphenylsulfone and held at 320° C. for a further 30 minutes. The reaction mixture was then poured into a foil tray, allowed to cool, milled and washed with 2 litres of acetone and then with warm water at a temperature of 40-50° C. until the conductivity of the waste water was <2 µS. The resulting polymer powder was dried in an air oven for 12 hours at 120° C.

Examples 15 to 24—Preparation of Polyetheretherketone (PEEK)-Polyetherdiphenyletherketone (PEDEK) Copolymer on a 200 Mol Scale A 300 litre vessel fitted with a lid, stirrer/stirrer guide, nitrogen inlet and outlet was charged with diphenylsulphone (125.52 kg) and heated to 150° C. Once fully melted 4,4'-diflurobenzophenone (44.82 kg, 205.4 mol), 1,4-dihydroxybenzene (16.518 kg, 150 mol) and 4,4'-dihydroxydiphenyl (9.311 kg, 50 mol) were charged to the vessel. The contents were then heated to 160° C. While maintaining a nitrogen blanket, dried sodium carbonate (21.368 kg, 201.6 mol) and potassium carbonate (1.106 kg, 8 mol), both sieved through a screen with a mesh of 500 micrometres, were added. The temperature was raised to 180° C. at 1° C./min and held for 100 minutes. The temperature was raised to 200° C. at 1° C./min and held for 20 minutes. The temperature was raised to 305° C. at 1° C./min and held until desired melt viscosity was reached, as determined by the torque rise of the stirrer. The required torque rise was determined from a calibration graph of torque rise versus MV. The reaction mixture was poured via a band caster into a water bath, allowed to cool, milled and washed with acetone and water. The resulting polymer powder was dried in a tumble dryer until the contents temperature measured 112° C.

Examples 25 to 28—Preparation of Polyetheretherketone (PEEK)-Polyetherdiphenyletherketone (PEDEK) Copolymer on a 200 Mol Scale The procedure described in Example 15 to 24 was repeated except that the quantity of DPS was 96.72 kg.

Table 1 below includes a summary of Examples 1 to 28. D50 as described herein was determined as described in Example 29.

Example 29—General Procedure for Determining D50

The $D_{50}$ of sodium carbonate was determined by Malvern Laser Diffractometer, using the associated Mastersizer 3000 software. A Fraunhofer type process was used to eliminate the requirement of refractive index figures for the samples. Using the Mastersizer 300 software, the following instrument parameters were set:

| Scattering Model | Fraunhofer |
|---|---|
| Background measurement duration | 10.00 s |
| Sample measurement duration | 10.00 s |
| Number of measurements | 2 |
| Obscuration low limit | 1% |
| Obscuration high limit | 6% |
| Obscuration time out | 5.00 s |
| Air Pressure | 1.5 barg |
| Feed Rate | 17% |
| Venturi type | Standard venturi disperser |
| Hopper gap | 2.00 mm |
| Analysis model | General Purpose |

A dried sample (<5 g) of carbonate was scooped into the hopper at the top of the machine. A background measurement was run, and then two sample measurements were taken. The feed rate was started at 17%, but was manually adjusted as the measurement was taken to ensure the obscuration measurement sat within the 1-6% limits.

In Table 1, the quantity of potassium carbonate is quoted in mole %. Unless otherwise stated herein, the mole % of potassium carbonate is defined as:

$$\frac{\text{the number of moles of potassium carbonate}}{\text{the total moles of hydroxy monomer(s) used}} \times 100\%$$

Melt viscosity (MV) referred to in Table 1 may be determined as described in Example 30.

Example 30—Determination of Melt Viscosity (MV) of Polymer

Unless otherwise stated, this was measured using capillary rheometry operating at 340° C. at a shear rate of 1000 $s^{-1}$ using a tungsten carbide die, 0.5 mm×3.175 mm. The MV measurement was taken 5 minutes after the polymer had fully melted, which is taken to be 5 minutes after the polymer is loaded into the barrel of the rheometer.

TABLE 1

| Example No. | Sodium Carbonate Sieve Size (μm) | Sodium Carbonate $D_{50}$ (μm) | Quantity Potassium Carbonate (mole %) | MV (@ 340° C.) |
|---|---|---|---|---|
| 1 | 500 | 96.7 | 4 | 0.22 |
| 2 | 125 | 67.7 | 0.25 | 0.22 |
| 3 | 125 | 67.7 | 2 | 0.28 |
| 4 | 300 | 93.1 | 0.25 | 0.14 |
| 5 | 300 | 93.1 | 2 | 0.34 |
| 6 | 500 | 96.7 | 0.25 | 0.12 |
| 7 | 500 | 96.7 | 0.25 | 0.13 |
| 8 | 500 | 96.7 | 0.25 | 0.31 |
| 9 | 500 | 96.7 | 2 | 0.34 |
| 10 | 500 | 96.7 | 0.5 | 0.18 |
| 11 | 500 | 96.7 | 0.5 | 0.30 |
| 12 | 500 | 140 | 0.5 | 0.12 |
| 13 | 500 | 96.7 | 5 | 0.62 |
| 14 | 500 | 96.7 | 5 | 0.52 |
| 15 | 500 | 98.7 | 4 | 0.25 |
| 16 | 500 | 98.7 | 4 | 0.203 |
| 17 | 500 | 98.7 | 4 | 0.258 |
| 18 | 500 | 98.7 | 4 | 0.283 |
| 19 | 500 | 98.7 | 4 | 0.324 |
| 20 | 500 | 98.7 | 4 | 0.222 |
| 21 | 500 | 98.7 | 4 | 0.26 |
| 22 | 500 | 98.7 | 4 | 0.269 |
| 23 | 500 | 98.7 | 4 | 0.186 |
| 24 | 500 | 98.7 | 4 | 0.295 |
| 25 | 500 | 98.7 | 4 | 0.406 |
| 26 | 500 | 98.7 | 4 | 1.707 |
| 27 | 500 | 98.7 | 4 | 1.305 |
| 28 | 500 | 98.7 | 4 | 0.853 |

Example 31—Differential Scanning Calorimetry of Polyaryletherketones of Examples 1 to 28

Crystallinity (as reported in Table 2) may be assessed by several methods for example by density, by ir spectroscopy, by x ray diffraction or by differential scanning calorimetry (DSC). The DSC method has been used to evaluate the crystallinity that developed in the polymers from Examples 1-28 using a Mettler Toledo DSC1 Star system with FRS5 sensor.

The Glass Transition Temperature (Tg), the Cold Crystallisation Temperature (Tn), the Melting Temperature (Tm) and Heat of Fusions of Nucleation (ΔHn) and Melting (ΔHm) for the polymers from Examples 1 to 28 were determined using the following DSC method.

A dried sample of each polymer was compression moulded into an amorphous film, by heating 7 g of polymer in a mould at 400° C. under a pressure of 50 bar for 2 minutes, then quenching in cold water producing a film of dimensions 120×120 mm, with a thickness in the region of 0.20 mm. An 8 mg plus or minus 3 mg sample of each film was scanned by DSC as follows:

Step 1 Perform and record a preliminary thermal cycle by heating the sample from 30° C. to 400° C. at 20° C./min.
Step 2 Hold for 5 minutes.
Step 3 Cool at 20° C./min to 30° C. and hold for 5 mins.
Step 4 Re-heat from 30° C. to 400° C. at 20° C./min, recording the Tg, Tn, Tm, ΔHn and ΔHm.

From the DSC trace resulting from the scan in step 4, the onset of the Tg was obtained as the intersection of the lines drawn along the pre-transition baseline and a line drawn along the greatest slope obtained during the transition. The Tn was the temperature at which the main peak of the cold crystallisation exotherm reaches a maximum. The Tm was the temperature at which the main peak of the melting endotherm reach maximum.

The Heat of Fusion for melting (ΔHm) was obtained by connecting the two points at which the melting endotherm deviates from the relatively straight baseline. The integrated area under the endotherm as a function of time yields the enthalpy (mJ) of the melting transition: the mass normalised heat of fusion is calculated by dividing the enthalpy by the mass of the specimen (J/g). The level of crystallisation (%) is determined by dividing the Heat of Fusion of the specimen by the Heat of Fusion of a totally crystalline polymer, which for polyetheretherketone is 130 J/g.

Results are provided in Table 2.

| Polymer from Example | Tg (° C.) | Tn (° C.) | $\Delta H_n$ (J/g) | Tm (° C.) | $\Delta H_m$ (J/g) | Level of Crystallinity (%) |
|---|---|---|---|---|---|---|
| 1 | 148.00 | n/a | n/a | 305.00 | 35.47 | 28.55 |
| 2 | 147.21 | 204.80 | 7.30 | 304.18 | 33.10 | 19.54 |
| 3 | 150.27 | n/a | n/a | 303.05 | 30.42 | 23.40 |
| 4 | 148.18 | n/a | n/a | 306.47 | 32.40 | 24.93 |
| 5 | 149.06 | n/a | n/a | 303.51 | 32.25 | 24.81 |
| 6 | 140.47 | n/a | n/a | 305.41 | 34.87 | 26.82 |
| 7 | 148.78 | n/a | n/a | 306.73 | 25.75 | 27.50 |
| 8 | 147.00 | 200.10 | 2.75 | 302.11 | 33.17 | 23.68 |
| 9 | 148.26 | n/a | n/a | 303.19 | 30.56 | 23.51 |
| 10 | 150.09 | n/a | n/a | 305.52 | 32.72 | 25.63 |
| 11 | 149.19 | n/a | n/a | 303.47 | 31.79 | 24.45 |
| 12 | 148.47 | n/a | n/a | 307.68 | 37.17 | 28.59 |
| 13 | 153.65 | n/a | n/a | 303.67 | 26.04 | 20.04 |
| 14 | 152.76 | n/a | n/a | 302.14 | 27.38 | 21.06 |
| 15 | 150.42 | n/a | n/a | 304.57 | 38.77 | 29.83 |
| 16 | 149.6 | n/a | n/a | 305.58 | 39.88 | 30.68 |
| 17 | 150.03 | n/a | n/a | 306.45 | 36.99 | 28.45 |
| 18 | 150.86 | n/a | n/a | 306.32 | 37.19 | 28.6 |
| 19 | 150.84 | n/a | n/a | 306.41 | 36.56 | 28.12 |
| 20 | 150.2 | n/a | n/a | 307.68 | 36.82 | 28.32 |
| 21 | 150.34 | n/a | n/a | 306.67 | 39.84 | 30.65 |
| 22 | 150.21 | n/a | n/a | 307.03 | 35.47 | 27.28 |
| 23 | 150.03 | n/a | n/a | 306.72 | 39.64 | 30.49 |
| 24 | 150.11 | n/a | n/a | 292.36 | 43.03 | 33.11 |
| 25 | 149.1 | n/a | n/a | 301.6 | n/a | 27.00 |
| 26 | 154.0 | n/a | n/a | 294.0 | n/a | 17.50 |
| 27 | 152.5 | n/a | n/a | 296.5 | n/a | 20.40 |
| 28 | 151.7 | n/a | n/a | 297.6 | n/a | 21.60 |

Example 32—Mechanical Properties

The mechanical properties of a blend of the materials of Examples 15 to 19 to give an MV of 0.25 kNsm$^{-2}$ were assessed in a series of tests and the results are provided in Table 3.

Table 3 also quotes results of mechanical tests undertaken on commercially available Victrex PEEK 150 for comparison.

TABLE 3

| Test | Conditions | Method | Units | Value | PEEK150 |
|---|---|---|---|---|---|
| Tensile strength | Yield, 23° C. | ISO 527 | MPa | 94 | 110 |
| Tensile Elongation | Break, 23° C. | ISO 527 | % | 24 | 25 |
| Tensile Modulus | 23° C. | ISO 527 | GPa | 3.5 | 3.7 |
| Flexural Strength | 23° C. | ISO 178 | MPa | 145 | 130 |
| Flexural Modulus | 23° C. | ISO 178 | GPa | 3.5 | 4.3 |
| Izod impact Strength | Notched, 23° C. | ISO 180/U | kJ m$^{-2}$ | 5.2 | 5.0 |

Discussion

In general terms, it is found that the process described herein can be used to produce PEEK:PEDEK copolymers which have advantageously higher crystallinities than expected. Referring to FIG. 1, the results from Tables 1 and 2 are plotted. The graph describes log$_{10}$ (X %) (i.e. log$_{10}$ of the % crystallinity measured by DSC as described) v. the melt viscosity (MV) determined as described (i.e. using capillary rheometry operating at 340° C. at a shear rate of 1000 s-$^{1}$ using a tungsten carbide die 0.5 mm×3.175 mm. FIG. 1 shows a first series of points, being the results for Examples 1 and 15 to 28, (represented by squares) which have a crystallinity for a selected MV which is higher than a second series of points, being the results for Examples 2 to 14, (represented by triangles). The first series of points relate to polymeric materials made in processes which use at least 2.5 mole % based on the total moles of hydroxy monomer(s), whereas the second series of points use less than 2.5 mole % potassium carbonate based on the total moles of hydroxy monomer(s) (Examples 2 to 12) or use 5 mole % potassium carbonate based on the total moles of hydroxy monomer(s) (Examples 13 and 14). It is clear that the level of potassium carbonate used affects the crystallinity of the PEEK:PEDEK copolymer, resulting in crystallinity which is higher than would be expected for example based on the disclosure in U.S. Pat. No. 4,717,761. The equation of the line for the second series of points is found to be $$\log_{10}(X\%)=1.45-0.24\ MV$$

FIG. 1 also includes a first calculated dividing line above the second series of points. The calculated dividing line is included to delineate polymeric materials which are in accordance with preferred embodiments of the invention (i.e. materials found above the dividing line) from those which are not in accordance with preferred embodiments of the invention (i.e. materials found below the dividing line). The equation of the dividing line is:

$$\log_{10}(X\%)=1.50-0.26\ MV$$

Thus, for polymeric materials in accordance with preferred embodiments, the following relationship applies:

$$\log_{10}(X\%)>1.50-0.26\ MV$$

FIG. 1 includes a second calculated dividing line above the first calculated dividing line, the second dividing line defines more preferred embodiments. Thus, more preferred embodiments fall above the second calculated dividing line and the following relationship applies:

$$\log_{10}(X\%)>1.50-0.23\ MV$$

where X and MV are determined as described.

FIG. 3 includes a third calculated dividing line above the second calculated dividing line. The third line defines especially preferred embodiments. Thus, especially preferred embodiments fall above the third calculated dividing line and the following relationship applies:

$$\log_{10}(X\%)>1.50-0.28\ MV+0.06\ MV^2$$

where X and MV are determined as described.

On the basis of the Examples described and other examples, the relationship graphically represented in FIG. 2 was determined. The reference to "poor crystallinity" means the crystallinity of the PEEK:PEDEK copolymers was less than 25%; and the reference to "good crystallinity" means the crystallinity of the copolymer was greater than 25%.

Referring to FIG. 2, preferred embodiments of the present invention use a process wherein the mole % of potassium carbonate based on the total moles of hydroxy monomer(s) is greater than 2.5 mole % or the following applies:

$$\frac{D50\ \text{of sodium carbonate in}\ \mu m}{\text{mole \% of potassium carbonate}}$$

is less or equal to 46.

In view of the differences between polymeric materials in accordance with preferred embodiments of the present invention and other materials described, NMR was used to assess materials as described in Example 28.

Example 33—NMR Analysis of PEEK:PEDEK Polymers and Comparison with PEEK Polymer Pressed films made from the polymeric materials of Example 21 (a material in accordance with a preferred embodiment of the invention), Example 4, Example 10 and PEEK 150 were assessed to determine any structural differences.

For the analysis a portion of each pressed film was dissolved in methane sulphonic acid/methylene dichloride solvent (the standard solvent used for polyaryletherketone polymers). In each case, the resulting solutions were clear to the naked eye, suggesting total solubility.

The solutions were examined using a Lambda 300 instrument at 25° C. to produce $^{13}$C NMR spectra. The carbonyl region of the spectrum was expanded and three carbonyl groups were identified in slightly different chemical environments as follows:
199.7 ppm PEEK homopolymer (seen in the PEEK 150 material assessed);
199.35 ppm PEDEK homopolymer;
199.5 ppm PEEK:PEDEK interchange unit (nb this resonance would not be present if the sample was a blend of two homopolymers (i.e. PEEK and PEDEK)).

On the basis that the PEEK:PEDEK copolymers have a 75:25 composition, the theoretical areas that would result from the aforementioned resonances if a sample was 100% random was determined. Then, the areas measured in the spectra were compared to the theoretical value yielding a % randomness of each PEEK:PEDEK material as described below.

| Example No. | % randomness |
|---|---|
| 10 | 30 |
| 4 | 23 |
| 21 | 38 |

Thus, it appears the process used in accordance with preferred embodiments of the invention results in production of a more random copolymer which results in an increase in crystallinity over and above the level of crystallinity that may be expected.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A polymeric material having a repeat unit of formula

—O-Ph-O-Ph-CO-Ph-   I and a repeat unit of formula

—O-Ph-Ph-O-Ph-CO-Ph-   II wherein Ph represents a phenylene moiety;
wherein the repeat units I and II are in the relative molar proportions I:II of from 65:35 to 95:5;
wherein the melt viscosity MV of the polymeric material is at least 0.2 kNsm$^{-2}$ and less than 1.8 kNsm$^{-2}$ as measured by capillary rheometry at 340° C. at a shear rate of 1000 s$^{-1}$ using a tungsten carbide die 0.5 mm×3.175 mm;
wherein $\log_{10}$ (X %)>1.50-0.26 MV;
wherein X % refers to the % crystallinity of an 8+/−3 mg sample from a cold-water quenched 120 mm×120 mm×0.2 mm amorphous film of the polymeric material formed by compression moulding 7 g of the polymeric material at 400° C. under a pressure of 50 bar for 2 minutes;
wherein the % crystallinity is measured by heating the 8+/−3 mg sample in a differential scanning calorimeter from 30° C. to 400° C. at 20° C./min, held at 500° C. for 5 minutes, cooled to 30° C. at 20° C./min then held at 30° C. for 5 minutes prior to re-heating from 30° C. to 400° C. at 20° C./min to provide a melting endotherm as a function of time;
wherein the heat of fusion for melting in J/g is obtained by connecting two points at which the melting endotherm differs from the straight baseline, integrating the area under the melting endotherm, and dividing the area by the sample weight;
wherein the % crystallinity is obtained by expressing the heat of fusion as a percentage of 130 J/g; and
wherein the melting temperature Tm of the polymeric material is less than 320° C.;
wherein said polymeric material is prepared by process comprising polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate wherein:

(i) the mole % of said potassium carbonate is in a range 2.5 to 4.9% and is defined as $$\frac{\text{the number of moles of potassium carbonate}}{\text{the total number of moles of hydroxy monomer(s) used}} \times 100.$$

2. A polymetric material according to claim 1, wherein at least 95% of the number of phenylene moieties (Ph) in the repeat unit of formula I have 1,4-linkages to moieties to which they are bonded; and at least 95% of the number of phenylene moieties (Ph) in the repeat unit of formula II have 1,4-linkages to moieties to which they are bonded.

3. A polymetric material according to claim 1, wherein $\log_{10}$ (X %)>1.50−0.23 MV.

4. A polymeric material according to claim 1, wherein $\log_{10}$ (X %)>1.50−0.28 MV+0.06 MV2.

5. A polymetric material according to claim 1, which includes 68 mol % to 82 mole % of units of formula I.

6. A polymetric material according to claim 1, which includes 72 to 77 mole % of units of formula I.

7. A polymetric material according to claim 1, which includes 18 to 32 mole % of units of formula II.

8. A polymetric material according to claim 1, which includes 23 to 28 mole % of units of formula II.

9. A polymetric material according to claim 1, wherein $T_m$ is in the range 300° C. to 310° C.

10. A polymetric material according to claim 1, wherein said polymeric material has a $T_g$ in the range 145° C.-155° C., a $T_m$ in the range 300° C. to 310° C. and the difference between the $T_m$ and $T_g$ is in the range 145° C. to 165° C.

11. A polymetric material according to claim 1, which has a crystallinity of at least 25%.

12. A material according to claim 1, wherein the mole % of said potassium carbonate is in the range 3.5 to 4.9%.

13. A polymetric composition comprising a material according to claim 1 and a filler.

14. A composition according to claim 13, wherein said filler comprises one or more fillers selected from glass fibre, carbon fibre, carbon black, talc, and a fluorocarbon resin.

15. A process for the production of a polymeric material having a repeat unit of formula —O-Ph-O-Ph-CO-Ph-   I and a repeat unit of formula —O-Ph-Ph-O-Ph-CO-Ph-   II wherein Ph represents a phenylene moiety, said process comprising polycondensing a mixture of at least one dihydroxybenzene compound and at least one dihydroxybiphenyl compound in the molar proportions 65:35 to 95:5 with at least one dihalobenzophenone in the presence of sodium carbonate and potassium carbonate wherein:

(i) the mole % of said potassium carbonate is in a range 2.5 to 4.9% and is defined as $$\frac{\text{the number of moles of potassium carbonate}}{\text{the total number of moles of hydroxy monomer(s) used}} \times 100.$$

16. A process according to claim 15, wherein the mole % of sodium carbonate used in the process is at least 90 mole %.

17. A process according to claim 15, wherein the $D_{50}$/mole % relationship is less than 30.

18. A process according to claim 15, which comprises selecting a dihydroxybenzene compound of formula

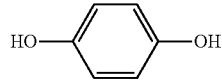

and selecting a dihydroxybiphenyl compound of formula

V

VI

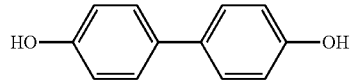

wherein molar proportions of compounds V and VI are in the range 65:35 to 95:5, the process comprising polycondensing said compounds of formulas V and VI with a compound of formula

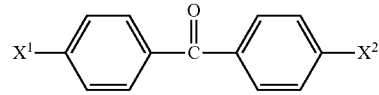

VII where $X^1$ and $X^2$ independently represent halogen atoms.

19. A process according to claim 18, wherein at least 95 wt % of monomers used in the process are made up of monomers of formulae V, VI and VII.

20. A process according to claim 15, wherein the following relationship (referred to as the "$D_{50}$/mole % relationship") applies $$\frac{\text{the } D_{50} \text{ of said sodium carbonate in } \mu m}{\text{mole \% of potassium carbonate}} = < 46.$$

21. A process according to claim 15, wherein the process further comprises a step of sieving the sodium carbonate and potassium carbonate through a screen with a mesh of 500 micrometers.

22. A process according to claim 15, wherein the mole % of said potassium carbonate is in the range 3.5 to 4.9%.

* * * * *